Figure 1:
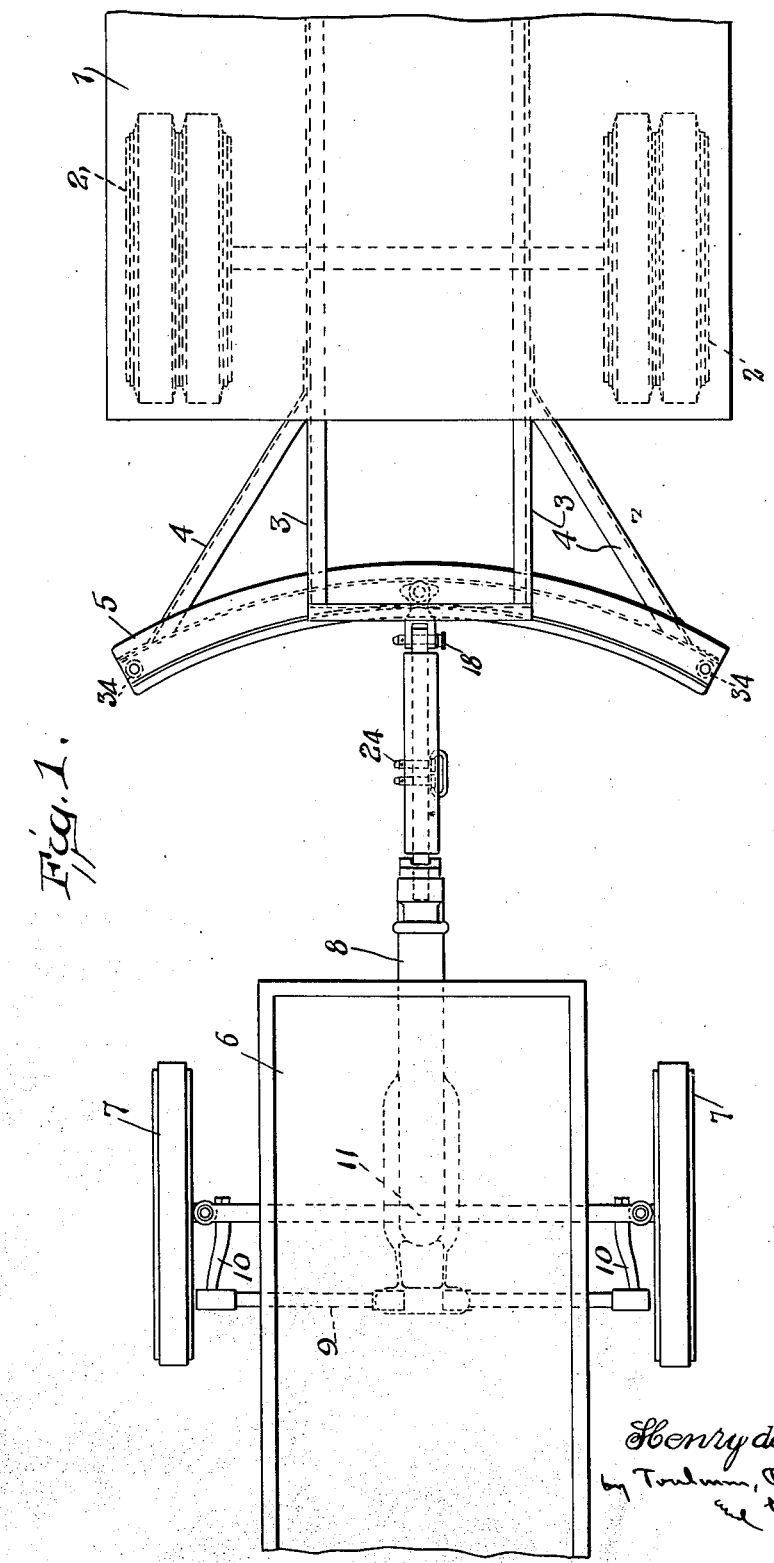

H. DE HAESELEER.
TRUCK COUPLING.
APPLICATION FILED OCT. 14, 1918.

1,304,276.

Patented May 20, 1919.
2 SHEETS—SHEET 1.

Inventor
Henry de Haeseleer
Attorneys

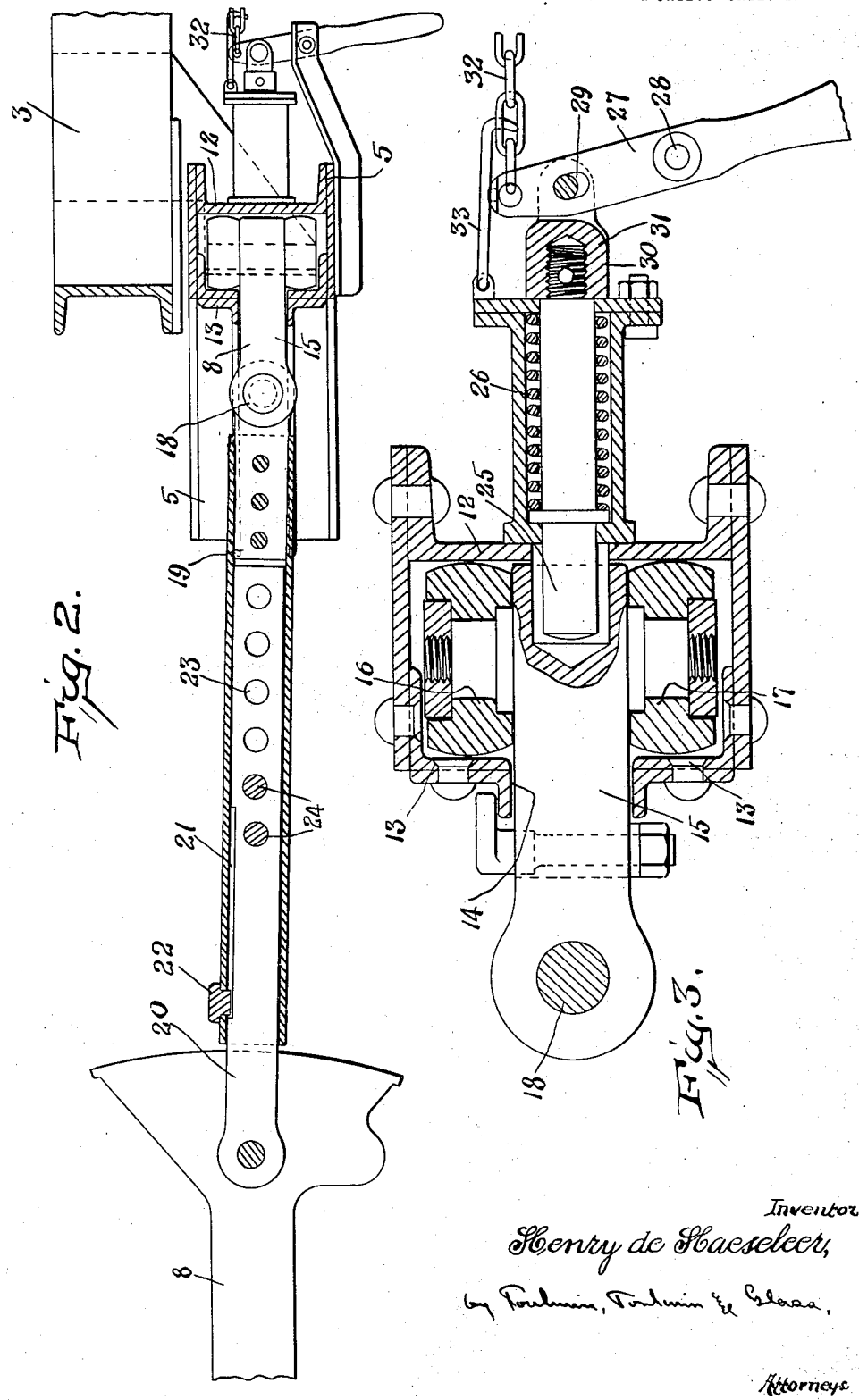

UNITED STATES PATENT OFFICE.

HENRY DE HAESELEER, OF PARIS, FRANCE, ASSIGNOR TO THE TROY WAGON WORKS COMPANY, OF TROY, OHIO, A CORPORATION OF OHIO.

TRUCK-COUPLING.

1,304,276.           Specification of Letters Patent.     Patented May 20, 1919.

Application filed October 14, 1918. Serial No. 257,997.

*To all whom it may concern:*

Be it known that I, HENRY DE HAESELEER, a citizen of France, residing at Paris, in the country of France, have invented certain new and useful Improvements in Truck-Couplings, of which the following is a specification, reference being had therein to the accompanying drawing.

This invention relates to truck couplers and particularly to automobile truck couplers, the main object being to provide an improved connection between a leading and a trailing vehicle, especially adapted for use in the modern method of moving these vehicles in trains. It is customary to employ a motor driven leading truck and to attach to it one or more trailing trucks which are drawn by the leading truck. It is frequently necessary to back or reverse these trains and to this end it is customary to provide the trailing trucks with two pairs of supporting wheels with means for turning either of these pairs so as to guide the truck around curves. The particular pair which is at any time the leading pair is employed to steer the vehicle and the other pair which is the following pair of wheels is held against rotation relative to the axle so as to cause the truck to steer properly. To hold the following pair of wheels in correct position it is usual to provide means for locking the draft bar connected to them in its central position.

It has been found, however, that when such a train of trucks is employed it is sometimes necessary after they have been moved in a forward direction to reverse the movement and back them so as, for example, to get the trailing truck in some desired position. If the train stops on a curve, that is, with the leading and trailing trucks not exactly headed in the same direction, the draft bar connecting the two will not be in its central position when the train stops. If then it is desired to back the train the pair of wheels of the trailing truck which has hitherto been the leading pair will become the following pair and therefore should be held in normal central position. But if the train stops on a curve as before stated the draft bar obviously will not be in central position and therefore there will be difficulty in backing the train.

It is the principal object of this invention to provide a construction such that the train may readily be backed even if the vehicles are stopped in positions out of the same straight line.

Figure 1 of the drawings is a plan view showing somewhat generally the connection between a leading truck at the right of the figure and a trailing truck at the left. Only the rear end of the leading truck and the forward end of the trailing truck are shown.

Fig. 2 is a vertical view largely in section of the draft bar connection shown in Fig. 1; and Fig. 3 is an enlarged view, mostly in elevation, of the parts at the right hand end of Fig. 2.

Referring to Fig. 1 the leading truck 1 is provided with driving wheels 2, as is customary, and a frame 3 projects from the rear end of the truck. This may be of any desired shape as it is merely a supporting frame, but it is shown as more or less rectangular in form and as being provided with angle bars 4. Carried under the outer end of the frame 3 is a curved track 5 to which one end of the angle bars 4 are fastened. The curve of track 5 is convex toward the rear end of the leading truck and it extends to more or less the same width as the truck body. Of course, the actual extent of the track 5 shown is not necessarily employed.

The trailing truck 6 is provided with the usual pair of wheels 7 and these wheels are connected with draft bar 8, only one being shown. The connection may be substantially that shown in the patent to Hudson 1,214,037, Jany. 30, 1917. From that patent it will be seen that the draft bar 8 is connected through drag links 9 to steering arms 10 which serve to turn the wheels 7.

If the train shown in Fig. 1 is to be moved to the right the draft bar 8 may swing around its pivot 11 on the frame of truck 6 and thus guide the truck. As shown, the forward or outer end of the draft bar 8 is adapted to move through the curved track 5 and the type of connection will be later described. Here it may be pointed out that in the forward movement of the train (to the right in Fig. 1) the draft bar 8 will be held centrally of the track 5 by a locking device so that the trailing vehicle 6 will readily follow the leading vehicle 1.

If the train stops on a curve after a forward movement it will be evident that while the draft bar 8 will have its outer end positioned centrally of the track 5 the draft bar will not be central as compared with the trailing truck 6. If it is then desired to back the train the pair of wheels 7 shown in the figure become the following wheels and should be returned to the position of Fig. 1. However, this implies a rotation of the draft bar 8 around its pivot 11 and to permit such rotation and still permit driving of the trailing truck to the left in Fig. 1 is the object of the invention.

Referring now to Figs. 2 and 3 the frame 3 is shown as supporting the track 5. This track has generally the construction of a plate girder having a solid web 12 and a web 13 which is cut away longitudinally, as at 14, providing a slot throughout the length of the track. The outer end of the draft bar 8 is composed of a pivoted arm 15 on the end of which are shown upper and lower rollers 16 and 17 carried on a pin passing through the arm 15. These rollers are adapted to ride on the web 13 of the track 5. The part 15 has a pivotal connection 18 with a telescoping section 19 of the draft bar. This section surrounds a second telescoping section 20 and the extent of relative movement between these sections is determined by the length of a slot 21 in section 20 into which passes a pin 22 in the section 19. These two sections are each provided with a series of equidistant holes 23 and through any of the holes a pin 24 may be passed. This pin is shown in Fig. 1 as double, but obviously a single pin may be employed.

To retain the draft bar in central position, shown in Fig. 1, a locking bolt 25 is mounted on the web 12 of the track 5 and is provided with a spring 26 tending to move it to the locking position of Fig. 3. In this position it passes into a hole in the arm 15 and thus prevents lateral movement of the draft bar 8.

To withdraw the bolt 25 an arm 27 is pivoted as at 28 on any convenient portion of the leading truck and this arm has a slot and pin connection 29 with the locking bolt 25 or rather with a cap 30 arranged to be screwed to a threaded portion 31 of the locking bolt. Thus operation of the handle 27 either directly or through a chain 32 will withdraw the locking bolt 25 and this bolt may be held in withdrawn position by any type of keeper 33. If the chain 32 is employed the bolt may be operated from the driver's seat of the leading truck.

When the train is to move to the right in Fig. 1 the locking bolt 25 is permitted to engage the arm 15 and thus hold the draft bar 8 in its central position in the track 5. Then the forward movement of the train takes place as usual. If the train after such a forward movement stops on a curve then the draft bar 8 will not be central relative to the trailing truck 6 and if a backing movement is to be given the draft bar may be manually moved until it does reach its normal central position as to the truck 6. The patent to Eccard and Smith, No. 1,117,816, Nov. 17, 1914, shows means for locking such a draft bar in its central position on the trailing truck, which is usable here.

Such a manual movement of the draft bar will move the rollers 16 out of their central position in the track 5 but it will be seen that irrespective of their position in this track the train may nevertheless be readily backed. The driver of the leading truck 1 is not required to keep his truck nearly as close in line with the trailing truck 6 in backing movements as would be the case without the employment of the track 5. The rearward movement of the train may be given with the rollers in any part of the track 5 and in fact they may roll along this track as the train is backed if different relative inclinations of the two trucks are necessary.

The object of the telescoping sections 19 and 20 is to provide for this manual rotation of the draft bar 8. In the position of Fig. 1 the track 5, which is circular, has the pivot 11 as its center. But if the two trucks are not in the same straight line the center from which track 5 is struck will not be coincident with the pivot 11. Thus, the telescoping sections permit the draft bar as a whole to be made longer or shorter so that the rollers 16 may nevertheless be moved through the track 5. When the desired relation of the telescoping sections is obtained they are locked in that position by the pin 24.

It is obvious, of course, that the draw bar need not be of the exact telescopic construction shown to adapt it to the purposes of my invention. Any construction of the draw bar which will permit it to be lengthened and shortened to compensate for the variable positions of its pivoted end which travels in the circular track will meet the requirements.

The track 5 may be provided at its ends with bars 34 passing through the flanges of the girder so as to limit the movement of rollers 16—17 and prevent them passing entirely out of the track. In order to separate the two trucks it is necessary merely to remove one of the bars 34 whereupon the draft bar may be manually moved to carry the rollers out of the track 5.

It will be seen that in the forward movement of the train the draft bar 8 is free to swing around its pivot 11 on the trailing truck so as to guide the trailing truck around curves. Also the outer end of the draft bar is held fast centrally of the track 5 by the locking plunger. In rearward movements of the train, the draft bar is held centrally of the truck 6 by some type of locking device, the one shown in the cited patent, for example. Then the draft bar may have any position relative to the track 5 and still the truck 1 may readily push the truck 6, the rollers 16, 17 moving along the track 5 if the backing is on a curve. During such backing movement the steering of the truck 6 is done by the pair of wheels which are not shown in Fig. 1, as is evident from the patent to Hudson referred to above.

While I have shown and described certain features as constituting my invention, it will be understood that parts have been shown for purposes of illustration only, and that I do not desire to be limited to such details, but wish to treat the invention more broadly as defined and comprehended in the appended claims, as obvious modifications will occur to a person skilled in the art.

Having thus fully described my invention, what I claim as new and desire to secure by Letters Patent, is:—

1. In a draft mechanism, the combination, with a leading truck, a frame extending from the rear end of the truck, and a curved track supported by said frame and having two oppositely disposed parallel walls, said track having its curve convex toward the rear end of said leading truck, of a trailing truck having a draft bar extending therefrom, the outer end of said draft bar having rollers riding in said curved track between said walls.

2. In a draft mechanism, the combination, with a leading truck, a frame extending from the rear end of the truck, and a circular track supported by said frame, the track being convex toward the end of the leading truck and extending to substantially the width of the truck, of a trailing truck having a draft bar connected thereto, said draft bar having rollers riding in said circular track, with means for locking said draft bar at the center of said track.

3. In a draft mechanism, the combination, with a leading truck, a frame extending rearwardly from said truck, and a circular track supported by said frame, said track having oppositely disposed walls convex toward the rear end of the leading truck, of a trailing truck having a draft bar pivoted thereto, said draft bar having copensating sections and at its outer end having rollers riding on said circular track between said walls with means for locking the draft bar at the center of said track.

4. In a draft mechanism, the combination, with a leading truck, and a curved track supported by said truck outside of its rear end, said track being convex toward the rear end of said truck, of a trailing truck having a draft bar pivoted thereto, the draft bar being composed of a first portion directly pivoted to the truck, and a second portion composed of compensating sections, one pivoted to the first portion of the bar so as to permit relative vertical oscillation only and a draft element having rollers riding in said curved track, and pivoted to the end of the other of said compensating sections.

5. In a draft mechanism, the combination, with a leading truck having a curved track supported thereby, of a trailing truck having a draft bar extending to said track and provided with elements riding on said track, and a locking plunger carried by said track and being spring pressed toward a position for locking said draft bar elements at the center of said track, with manually operated means for withdrawing the locking plunger from locking position, and devices for maintaining said plunger in ineffective position.

In testimony whereof, I affix my signature.

HENRY DE HAESELEER.